United States Patent
Domahidy

(10) Patent No.: US 8,561,498 B2
(45) Date of Patent: Oct. 22, 2013

(54) BICYCLE ECCENTRIC BOTTOM BRACKET

(75) Inventor: Steve Domahidy, Denver, CO (US)

(73) Assignee: Niner, Inc., Fort Collins, CO (US)

( * ) Notice: Subject to any disclaimer, the term of this patent is extended or adjusted under 35 U.S.C. 154(b) by 1229 days.

(21) Appl. No.: 12/030,133

(22) Filed: Feb. 12, 2008

(65) Prior Publication Data

US 2009/0199677 A1  Aug. 13, 2009

(51) Int. Cl.
*B62K 19/34* (2006.01)

(52) U.S. Cl.
USPC .......................... 74/570.1; 74/594.3; 474/112

(58) Field of Classification Search
USPC ........ 74/570.1, 571.1, 594.1, 594.3; 384/431, 384/458; 474/112, 113
See application file for complete search history.

(56) References Cited

U.S. PATENT DOCUMENTS

| | | | |
|---|---|---|---|
| 515,349 A * | 2/1894 | Margach | 74/570.3 |
| 517,995 A * | 4/1894 | Bailey | 474/78 |
| 620,241 A * | 2/1899 | Levedahl | 474/112 |
| 628,820 A * | 7/1899 | Lamplugh | 301/110 |
| 648,937 A * | 5/1900 | Fauber | 474/112 |
| 716,129 A * | 12/1902 | Steinkamp | 474/78 |
| 3,733,919 A * | 5/1973 | Rupp, II | 474/112 |
| 4,808,147 A * | 2/1989 | Graham | 474/112 |
| 6,895,834 B1 * | 5/2005 | Baatz | 74/594.3 |
| 2006/0189426 A1 * | 8/2006 | Dodman et al. | 474/112 |

* cited by examiner

*Primary Examiner* — Thomas Diaz

(74) *Attorney, Agent, or Firm* — Alleman Hall McCoy Russell & Tuttle LLP

(57) ABSTRACT

An eccentric bottom bracket for a bicycle. The eccentric bottom bracket includes opposing first and second members. The first member and the second member each include a body and a flange. Each body is sized and shaped to penetrate an opening of a bottom bracket shell of a bicycle. Each flange is sized and shaped to prevent complete admittance of the member into the bottom bracket shell. Each body also has a bearing guide with an axis that is parallel to but offset from a center axis of the bottom bracket shell when that body is fit into the bottom bracket shell. The eccentric bottom bracket also includes a tightening assembly for selectively applying a compressive force between the body of the first member and the body of the second member. The compressive force secures the first member and the second member to the bottom bracket shell.

18 Claims, 4 Drawing Sheets

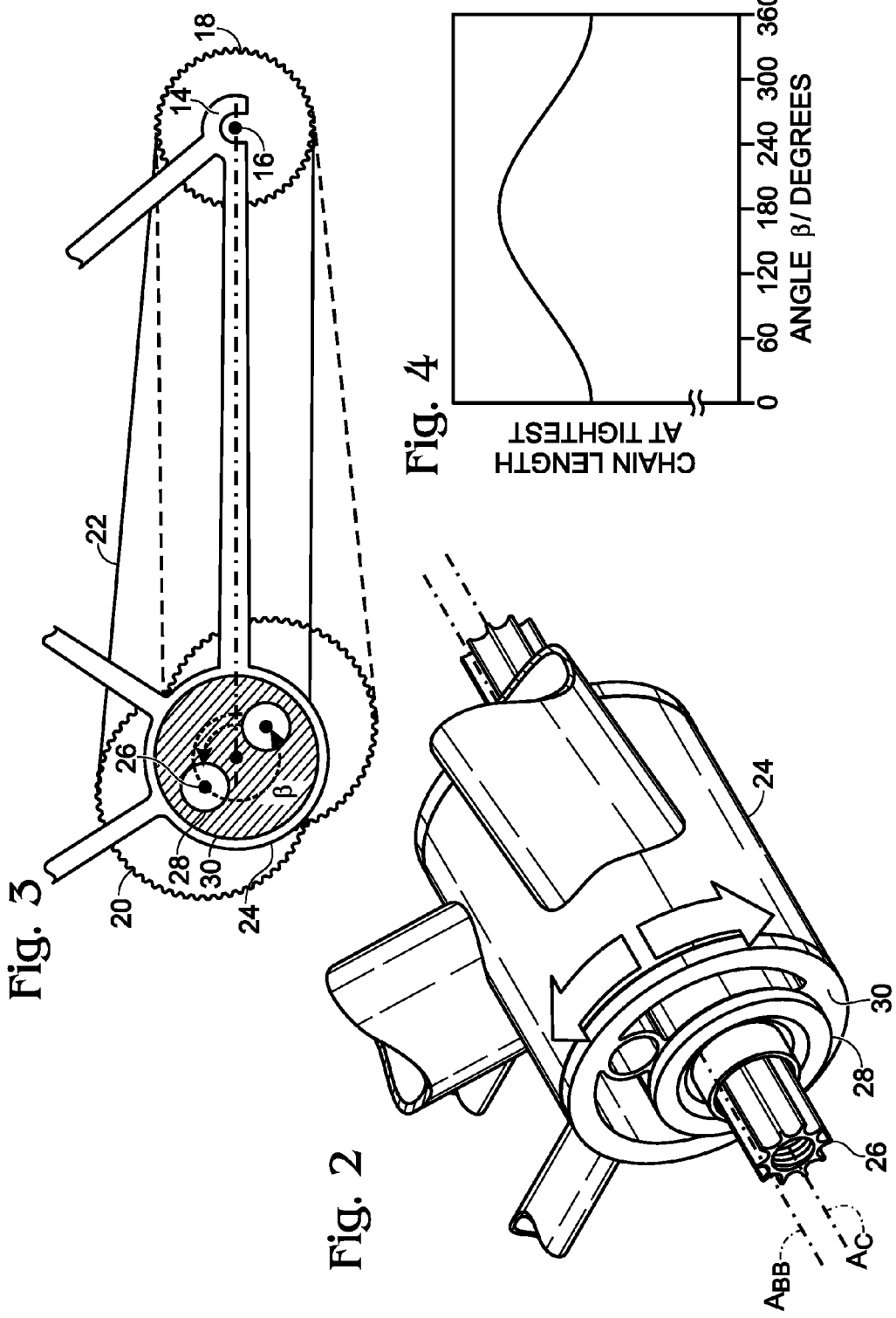

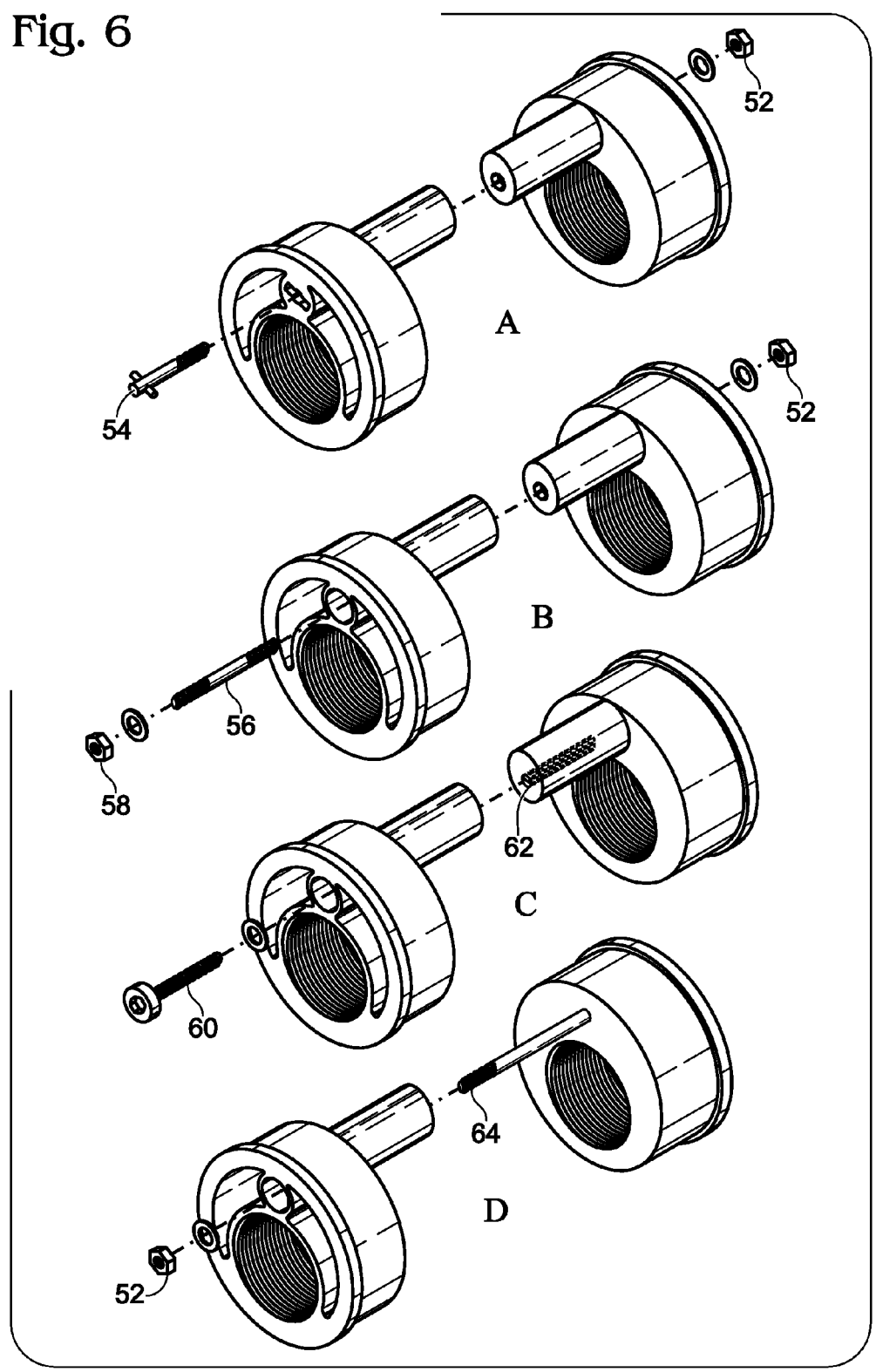

BICYCLE ECCENTRIC BOTTOM BRACKET

BACKGROUND

A chain transmits mechanical power from one or more crank sprockets to one or more hub sprockets on a bicycle. If the bicycle has multiple sprockets at the crank or the hub, it may also have a spring-loaded derailleur. In addition to shifting the chain between sprockets, the derailleur can maintain the tension of the chain. On single-speed and enclosed-hub bicycles, however, where derailleurs are typically absent, some other means of chain tensioning may be provided.

On some bicycles, the rear axle is mounted in a horizontally elongated rear dropout, more commonly called a horizontal rear dropout. Sliding the rear axle back and forth within the horizontal rear dropout changes the distance between the rear sprocket and the crank sprocket, thus changing the tension of the chain. The horizontal rear dropout does not ideally solve the problem of chain tensioning, however, as it can allow slippage of the axle and misalignment of the wheel. Moreover, it can be difficult to align disk brakes on bicycles that have horizontal rear dropouts, because changing the position of the rear axle within the rear dropout offsets the wheel-mounted disk with respect to the frame-mounted brake caliper.

SUMMARY

An eccentric bottom bracket and an associated method for adjusting the tension of a bicycle chain are provided. The eccentric bottom bracket includes two members, each having a body, a flange, and an eccentric opening for a crank bearing assembly. The flanges prevent either member from sliding through the bottom bracket shell of the bicycle frame, so that when the members are bolted or otherwise forced together, the flanges press against the sides of the bottom bracket shell, holding the eccentric bottom bracket together and securing it in place.

BRIEF DESCRIPTION OF THE DRAWINGS

FIG. 2 shows the bottom bracket shell of the bicycle of FIG. 1 with exemplary eccentric bottom bracket and crank spindle assemblies.

FIG. 3 shows schematically the drive train of the bicycle of FIG. 1.

FIG. 4 is a plot showing the length of a bicycle chain at maximum tightness as a function of an angle β as defined in FIG. 3.

FIG. 6 shows a variety of different eccentric bottom bracket assemblies in accordance with the present disclosure.

DETAILED DESCRIPTION

The present disclosure is directed to an eccentric bottom bracket assembly for bicycles. The eccentric bottom bracket assembly can be used to adjust a bicycle chain tension by changing the distance between the sprockets around which the chain is entrained.

A bottom bracket is a cylindrical mounting for a crank bearing assembly. It fits into a cylindrical opening in the bicycle frame called a bottom bracket shell. Many bicycles, especially those with other means of chain tensioning, have a concentric bottom bracket in which the axes of the crank bearing, the bottom bracket, and the bottom bracket shell all coincide. An eccentric bottom bracket, by contrast, is one in which the axis of the crank bearing is offset from the center axis of the bottom bracket and the center axis of the bottom bracket shell. Rotating an eccentric bottom bracket about its center axis changes the distance between the crank sprocket and the hub sprocket, and thereby changes the tension of the chain.

Figure 1:
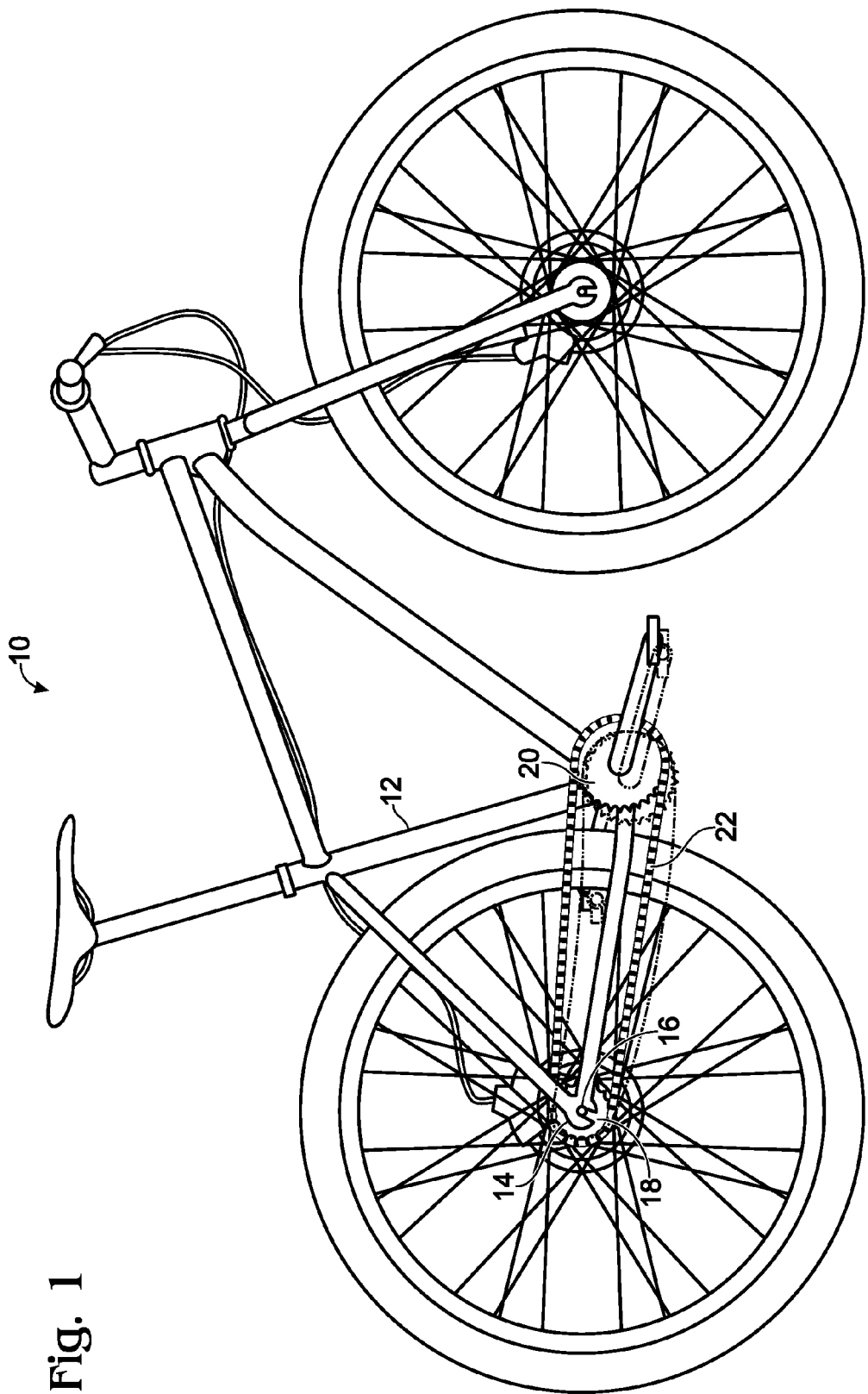
FIG. 1 shows an example bicycle including an eccentric bottom bracket in accordance with the present disclosure.

An eccentric bottom bracket assembly can be used with a bicycle having various other means of chain tensioning (such as a derailleur or a horizontal rear dropout), but it can also be used with a bicycle having no such means, such as the bicycle shown in FIG. 1. Moreover, the eccentric bottom bracket of the present disclosure does not require set-screw bosses, a split bottom bracket shell, or other special frame modifications utilized by other types of eccentric bottom brackets. The eccentric bottom bracket of the present disclosure is compatible with virtually any appropriately sized bottom bracket shell.

FIG. 1 shows a nonlimiting example of a bicycle that includes an eccentric bottom bracket in accordance with the present disclosure. Bicycle 10 includes frame 12 with vertical rear dropout 14. In contrast to the horizontal rear dropout described briefly in the Background, a vertical rear dropout holds the rear axle in a fixed position. Accordingly, vertical rear dropout 14 holds rear axle 16 as well as hub sprocket 18 in fixed positions. Bicycle 10 also includes crank sprocket 20, which is fixed to a crank spindle. Chain 22 is entrained around crank sprocket 20 and hub sprocket 18.

FIG. 2 is a detailed view of a bottom bracket shell 24 of bicycle 10. FIG. 2 shows the disposition of a crank spindle 26, with the crank sprocket omitted for clarity. As shown in FIG. 2, crank spindle 26 rotates in crank bearing assembly 28, which is mounted in eccentric bottom bracket 30. Eccentric bottom bracket 30 is seated in bottom bracket shell 24.

The longitudinal axis of crank spindle 26 can be referred to as the crank bearing axis or the crank spindle axis. The crank bearing axis is illustrated at $A_C$. An axis that extends through a center of bottom bracket shell 24 and bottom bracket 30 can be referred to as the center axis of the bottom bracket shell or the center axis of the bottom bracket. The center axis of the bottom bracket is illustrated at $A_{BB}$.

It should be understood that no aspect of FIG. 1 or 2 is intended to be limiting: not the details or dimensions of the illustrated parts, nor their number, nor the selection of parts omitted for clarity. For instance, while FIGS. 1 and 2 illustrate the tensioning of a drive chain of a bicycle, the eccentric bottom bracket disclosed herein may also be used to tension the timing chain of a tandem bicycle. In that particular case, the rear axle would be replaced by a second crank spindle.

Returning to FIG. 1, we note that chain 22 is shown at two exemplary levels of tensioning, which correspond to different orientations of the eccentric bottom bracket within the bottom bracket shell. The lower level of tensioning is represented by the dashed line, wherein crank sprocket 20 is closer to hub sprocket 18. For the sake of clarity, the figure shows only two levels of tensioning. It should be understood, however, that other orientations of the eccentric bottom bracket are indeed possible, and some of the embodiments described herein will provide a continuous range of chain tensioning.

The arrows in FIG. 2 indicate rotation of eccentric bottom bracket 30 within bottom bracket shell 24, such rotation displacing crank spindle 26 and crank sprocket 20 with respect to the bottom bracket shell, the frame, and the rear axle, and thereby changing the tension of the chain. Chain tensioning by rotation of the eccentric bottom bracket is further described with reference to FIGS. 3 and 4.

FIG. 3 shows eccentric bottom bracket 30 rotated through two different angles β. The angle of rotation in FIG. 3 is measured from the point where crank spindle 26 is closest to rear axle 16.

FIG. 4 shows the effect of the angle of rotation on the chain length at maximum chain tension. As can be seen, the chain length at maximum chain tension can be adjusted from a minimum length when β=0° to a maximum length when β=180°. The amount of variation between the minimum length and the maximum length is at least partially determined by the amount in which the crank bearing axis is offset from the center axis of the bottom bracket. Increased offset provides increased possible variation in chain length.

Figure 5:
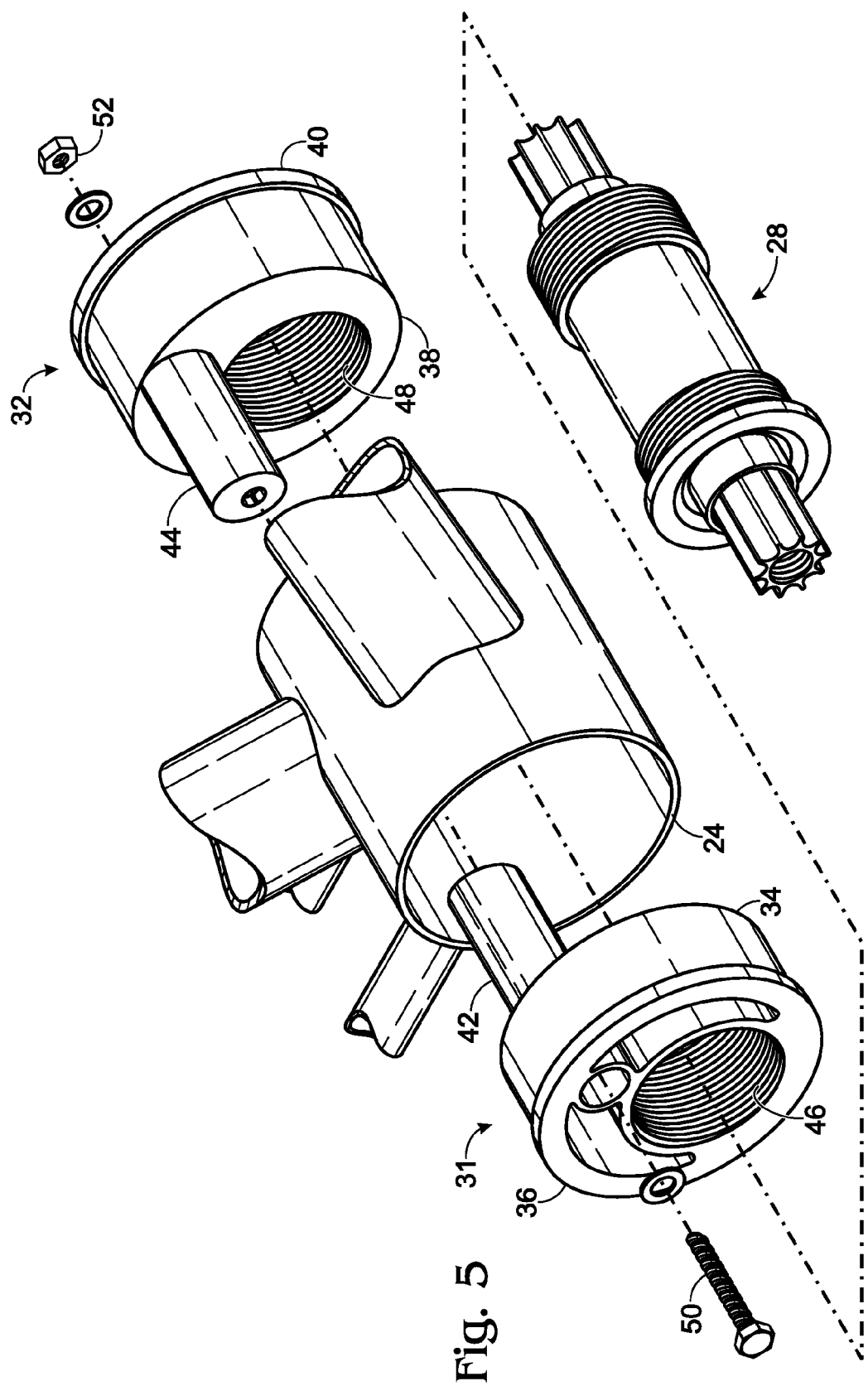
FIG. 5 is an exploded view of the eccentric bottom bracket and crank spindle assemblies of FIG. 2.

FIG. 5 is an exploded view of FIG. 2. FIG. 5 shows eccentric bottom bracket 30 including a first member 31 and a second member 32. In this example, opposing first and second members are configured for independent seating in bottom bracket shell 24. First member 31 includes first body 34 and first flange 36; second member 32 includes second body 38 and second flange 40.

In this example, each member is a machined, aluminum monolith. In other embodiments, the members may be composed of other materials, including but not limited to titanium, steel, stainless steel, and chromoly. They may be molded or formed by extrusion. Component parts of the members may be formed separately and held together by fasteners or adhesives. In some embodiments, different portions of the members may be composed of different materials.

In the example of FIG. 5, first flange 36 is disk shaped; first body 34 is cylindrical at its base but also comprises first shaft guide 42. The first shaft guide extends away from the first body and opposite the first flange. Second shaft guide 44 is disposed similarly on second member 32. The shaft guides may be integral to their respective bodies, i.e., machined from the same block, or they may be formed separately and attached to their respective bodies. In some embodiments, the shaft guides can be sized and/or shaped differently, or not included.

In the example of FIG. 5, the cylindrical base of first body 34 is approximately 54.9 millimeters (mm) in outside diameter, flange 36 is approximately 58 mm in outside diameter, and bottom bracket shell 24 is approximately 55 mm in inside diameter. In this example, the corresponding diameters of the components of the second member are equal to those of the first. Thus, each body is sized and shaped to penetrate an opening of the bottom bracket shell, while each flange prevents complete admittance of that member into the bottom bracket shell. In other embodiments, flanges and bodies of either member may be of different shapes and dimensions. For instance, flanges 36 and 40, while shown in FIG. 5 to be smooth and continuous, may in other embodiments be discontinuous or knurled. As another example, the flanges and bodies may be sized to fit a bottom bracket shell of virtually any size.

First body 34 and second body 38 each comprise a substantially cylindrical bearing guide, 46 and 48, respectively. In the example embodiment of FIG. 5, each bearing guide is a hole through the body that is tapped with a screw thread, the diameter of the hole and the pitch of the screw thread chosen to match the screw threads of a crank bearing assembly. The diameter, depth, screw thread, and other attributes of the bearing guides can be configured for compatibility with a number of different crank bearing assemblies In other embodiments, as appropriate for the intended crank bearing assembly, screw threads on one or more bearing guides may be absent. In still other embodiments, one or more of the bearing guides may comprise additional structure.

As shown in FIG. 5, when either body is fit into the bottom bracket shell, an axis of its bearing guide is parallel to but offset from a center axis of the bottom bracket shell. In the example of FIG. 5, first member 31 and second member 32 can rotate freely when seated in bottom bracket shell 24. In other embodiments, rotation may be possible but to a limited degree because of additional structure on eccentric bottom bracket 30, bottom bracket shell 24, or crank bearing assembly 28. By rotation of the first and second members, bearing guides 46 and 48 are alignable to receive crank bearing assembly 28.

In the example embodiment of FIG. 5, bodies 34 and 38 have additional milled-out openings. These are examples of weight-saving concavities which, in other embodiments, may be formed by molding or by extrusion. In still other embodiments, body 34 or 38 may have zones filled by a less-dense material than the material from which the rest of the body is made. Still other embodiments may comprise no such concavities or zones.

In the example embodiment of FIG. 5, eccentric bottom bracket 30 is installed by seating first member 31 and second member 32 into bottom bracket shell 24 and securing the members together via a compressive force of screw 50 on first body 34 in opposition to the force of nut 52 on second body 38. The compressive force between the bodies is transmitted to their respective flanges, which in turn exert compressive force on opposing rims of the bottom bracket shell. The resulting contact forces between the flanges and the rims of the bottom bracket shell hold the first member fixed with respect to the second member and secure both members to the bottom bracket shell. It must be appreciated, however, that the screw-nut combination is but one example of a great many tightening assemblies that may apply a compressive force between the bodies of both members, the compressive force holding one member fixed with respect to another and securing both to the bottom bracket shell. The tightening assembly can thus be configured to maintain and not disrupt the alignment of the bearing guides.

Furthermore, the tightening assembly must be able to relax the compressive force so that the axes of the bearing guides can rotate about the center axis of the bottom bracket shell, such rotation being possible even when the first and second members are seated in the bottom bracket shell. In the embodiment of FIG. 5, for example, the compressive force between bodies 34 and 38 is relaxable by counterrotation of screw 50 and nut 52, such that the axes of the aligned bearing guides can rotate about the center axis of bottom bracket shell 24. This feature allows the bicycle chain to be tensioned.

Typically, the tightening assembly will include a fastener that spans between the body of the first member and the body of the second member when both members are seated in the bottom bracket shell. FIG. 6 shows some additional examples of eccentric bottom brackets with different tightening assemblies. Assembly A includes fastener 54 having a threaded shaft that may be fit with nut 52 to compress opposing members of the bottom bracket against a bottom bracket shell. Assembly A and the assembly shown in FIG. 5 are both non-limiting examples wherein a shaft is admitted through the bodies of the first and second members, and a threaded nut is threaded to the shaft so as to force the bodies of the first and second members together. Assembly B includes shaft 56, threaded at both ends and admitted through both bodies, and threaded nuts 52 and 58, each for threading to an opposite end of the shaft. Assembly C includes shaft 60 with screw threads, wherein the shaft is admitted through the body of the first member and is screwed into complementary hole 62 in the body of the second member so as to force the bodies of the first member and the second member together. Assembly D includes shaft 64 having screw threads and threaded nut 52, wherein the shaft is fixed to the body of the first member and admitted through the body of the second member, and the threaded nut is threaded to the shaft so as to force the bodies of the first and second members together. In other embodiments, the fastener may comprise some other structure spanning between the bodies of seated first and second members and able to exert a compressive force therebetween.

The example embodiment of FIG. 5 and some embodiments of FIG. 6 further comprise shaft guides 42 and 44, which extend away from the body and opposite the flange. Other embodiments, such as assembly D of FIG. 6, comprise only one shaft guide, while still other embodiments may exclude a shaft guide. As shown in FIG. 5, shaft guides 42 and 44 are each configured to maintain the orientation of a shaft admitted therethrough. Finally, while the tightening assembly is shown in the figures to include only one shaft, other embodiments may include additional shafts. In embodiments in which the tightening assembly includes two or more shafts, two or more shaft guides may also be included.

The configuration of eccentric bottom bracket 30 as disclosed herein suggests a method to tension a chain of a bicycle having such a device installed. The method comprises relaxing the compressive force between first body 34 and second body 38, then rotating eccentric bottom bracket 30 in bottom bracket shell 24 to increase or decrease the tension of the chain, then restoring the compressive force between the bodies while keeping the eccentric bottom bracket in place, thereby holding the members fixed with respect to each other and securing both members to the bottom bracket shell.

What is claimed is:

1. An eccentric bottom bracket for a bicycle, the eccentric bottom bracket comprising:
   a first member;
   a second member separate from the first member, the first member and the second member each including a generally cylindrical body and a generally cylindrical flange, each body having an outer surface with an outer diameter substantially matching an inner diameter of an inner surface of a bottom bracket shell of the bicycle so that each body mates with different openings of the bottom bracket shell, each flange having an outer diameter greater than the inner diameter of the inner surface of the bottom bracket shell and preventing complete admittance of the member into the bottom bracket shell, each body having a bearing guide with an axis that is parallel to but offset from a center axis of the bottom bracket shell when that body is fit into the bottom bracket shell; and
   a tightening assembly for selectively applying a compressive force between the body of the first member and the body of the second member, the compressive force holding the first member fixed with respect to the second member and fixedly securing the first member and the second member against outer rims of the bottom bracket shell at an adjustable angle.

2. The eccentric bottom bracket of claim 1, wherein the bearing guide of the first member and the bearing guide of the second member are alignable with one another to receive a crank bearing assembly when the first and second members are seated in the bottom bracket shell.

3. The eccentric bottom bracket of claim 2, wherein the compressive force applied by the tightening assembly does not disrupt alignment of the bearing guide of the first member relative to the bearing guide of the second member.

4. The eccentric bottom bracket of claim 1, wherein the tightening assembly is configured to selectively relax the compressive force so that the axes of the bearing guides can rotate about the center axis of the bottom bracket shell when the first and second members are seated in the bottom bracket shell.

5. The eccentric bottom bracket of claim 1, wherein the tightening assembly includes a fastener that spans between the body of the first member and the body of the second member when the first and second members are seated in the bottom bracket shell.

6. The eccentric bottom bracket of claim 1, wherein the tightening assembly includes a shaft having screw threads and at least one threaded nut to match the screw threads, wherein the shaft is admitted through the bodies of the first member and the second member, and the threaded nut is threaded to the shaft so as to force the bodies of the first member and the second member together.

7. The eccentric bottom bracket of claim 6, wherein the tightening assembly includes two threaded nuts, each for threading to an opposite end of the shaft.

8. The eccentric bottom bracket of claim 1, wherein the tightening assembly includes a shaft having screw threads, and at least one threaded nut to match the screw threads, wherein the shaft is fixed to the body of the first member and admitted through the body of the second member and the threaded nut is threaded to the shaft so as to force the bodies of the first member and the second member together.

9. The eccentric bottom bracket of claim 1, wherein the tightening assembly includes a shaft with screw threads, wherein the shaft is admitted through the body of the first member and is screwed into a complementarily threaded hole in the body of the second member so as to force the bodies of the first member and the second member together.

10. The eccentric bottom bracket of claim 1, wherein the bearing guide in the body of the first member is threaded.

11. The eccentric bottom bracket of claim 1, wherein a greatest distance across the body of the first member in a plane parallel to the flange of the first member is greater than or equal to 55 millimeters.

12. The eccentric bottom bracket of claim 1, further comprising a shaft guide extending away from the body of the first member and opposite the flange of the first member.

13. The eccentric bottom bracket of claim 1, wherein the body of the first member includes a weight-saving concavity.

14. An eccentric bottom bracket for a bicycle, the eccentric bottom bracket comprising:
   opposing first and second members configured for independent seating into opposite sides of a bottom bracket shell of a bicycle frame, each member having a body and a flange, each body sized to touch an inner surface of the bottom bracket shell, each body including a bearing guide with an axis that is parallel to but offset from a center axis of the bottom bracket shell when that body is seated in the bottom bracket shell; and
   a tightening assembly for holding the bearing guide of the first member in alignment with the bearing guide of the second member, the tightening assembly configured to selectively tighten the flanges of the opposing first and second members against outer rims of the bottom bracket shell with enough compressive force to secure the first and second members at a fixed angle relative to the bottom bracket shell, and the tightening assembly configured to selectively loosen the flanges of the opposing first and second members from the bottom bracket shell so that the first and second members are rotatable relative to the bottom bracket shell.

15. The eccentric bottom bracket of claim 14, wherein the tightening assembly is configured to selectively relax so that the axes of the bearing guides can rotate about the center axis of the bottom bracket shell when the first and second members are seated in the bottom bracket shell.

16. The eccentric bottom bracket of claim 14, wherein the tightening assembly includes a fastener that spans between the first member and the second member when the first and second members are seated in the bottom bracket shell.

17. The eccentric bottom bracket of claim 14, wherein the tightening assembly includes a shaft having screw threads and at least one threaded nut to match the screw threads, wherein the shaft is admitted through the first member and the second member, and the threaded nut is threaded to the shaft so as to force the first member and the second member together.

18. An eccentric bottom bracket for a bicycle, the eccentric bottom bracket comprising:
   a first member including a first bearing guide and a first flange, the first bearing guide having an axis that is parallel to but offset an offset distance from a center axis of a bottom bracket shell and a body sized to mate with an inner surface of the bottom bracket shell, the first flange having an outer diameter that substantially matches an outer diameter of a first rim of the bottom bracket shell;
   a second member including a second bearing guide and a second flange, the second bearing guide having an axis that is parallel to but offset the offset distance from the center axis of the bottom bracket shell and a body sized to mate with the inner surface of the bottom bracket shell, the second flange having an outer diameter that substantially matches an outer diameter of a second rim of the bottom bracket shell;
   a screw configured to adjust a distance between the first flange and the second flange so as to adjust a compressive force of the first flange and the second flange against the first rim and the second rim of the bottom bracket shell, the screw configured to be loosened so that the first bearing guide and the second bearing guide are rotatable to a desired angle, and the screw configured to be tightened so that the first bearing guide and the second bearing guide are secured at the desired angle.

* * * * *